(12) United States Patent
Cheung

(10) Patent No.: US 7,366,299 B2
(45) Date of Patent: Apr. 29, 2008

(54) METHOD FOR ENCRYPTING AND DECRYPTING DATA USING DERIVATIVE EQUATIONS AND FACTORS

(75) Inventor: Tom Thuan Cheung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 10/672,811

(22) Filed: Sep. 26, 2003

(65) Prior Publication Data

US 2005/0069127 A1   Mar. 31, 2005

(51) Int. Cl.
*H04K 1/00* (2006.01)

(52) U.S. Cl. .............................. 380/28; 380/30; 380/42; 380/45; 380/46; 380/263; 713/168; 713/180; 708/491; 708/492; 709/217

(58) Field of Classification Search .................. 380/28, 380/30, 42, 45, 46, 263; 713/168, 180; 708/491, 708/492; 709/217
See application file for complete search history.

(56) References Cited

U.S. PATENT DOCUMENTS

| | | | | |
|---|---|---|---|---|
| 5,677,952 | A | 10/1997 | Blakley, III et al. | 380/4 |
| 5,751,811 | A | 5/1998 | Magnotti et al. | 380/28 |
| 5,781,632 | A | 7/1998 | Odom | 380/24 |
| 5,805,712 | A | 9/1998 | Davis | 380/50 |
| 5,862,325 | A | 1/1999 | Reed et al. | 395/200.31 |
| 5,915,024 | A | 6/1999 | Kitaori et al. | 380/25 |
| 5,987,133 | A | 11/1999 | Aisaka | 380/25 |
| 6,002,769 | A | 12/1999 | McGough | 380/28 |
| 6,075,865 | A * | 6/2000 | Scheidt et al. | 380/255 |
| 6,226,383 | B1 * | 5/2001 | Jablon | 380/30 |
| 6,226,618 | B1 | 5/2001 | Downs et al. | 705/1 |
| 6,230,272 | B1 | 5/2001 | Lockhart | 713/202 |
| 6,324,287 | B1 | 11/2001 | Angert | 380/43 |
| 6,345,288 | B1 | 2/2002 | Reed et al. | 709/201 |
| 6,351,813 | B1 | 2/2002 | Mooney et al. | 713/185 |
| 6,389,541 | B1 | 5/2002 | Patterson | 713/201 |
| 6,845,453 | B2 * | 1/2005 | Scheidt et al. | 726/5 |

OTHER PUBLICATIONS

Oxford on-line dictionary, http://dictionary.oed.com/entrance.dtl, Oxford University Press 2007, on the definition of the word "map" under 3/a math.*

* cited by examiner

Primary Examiner—Kim Vu
Assistant Examiner—April Y. Shan
(74) Attorney, Agent, or Firm—Sawyer Law Group LLP

(57) ABSTRACT

A data cryptographer encrypts and decrypts character data of any given length using derivative equations and factors. The use of factors and derivative equations introduces the randomness required for effective encryption without the use of complex mathematics. A set of equations determined by the user is used in a manner similar to a key but with random results. Only a portion of the key is exposed to decrypt the encrypted information. The data cryptographer may be configured using either simple or complex equations and may be implemented in an unlimited number of variations. The data cryptographer is portable, and can be implemented in any programming language that supports cyclical character manipulation. The data cryptographer also supports input from a variety of sources, allowing control from the administrator side, string value side, or any other input that may be extracted from the desired programming language.

9 Claims, 6 Drawing Sheets

METHOD FOR ENCRYPTING AND DECRYPTING DATA USING DERIVATIVE EQUATIONS AND FACTORS

FIELD OF THE INVENTION

The present invention generally relates to cryptography, and more particularly to a method encryption and decryption utilizing customizable equations and random values to securely encrypt and decrypt information.

BACKGROUND OF THE INVENTION

Businesses, organizations, and individuals are becoming increasingly dependent on computers and data transmission. Consequently, large amounts of communicated data need to be secure from unauthorized access. A primary method of securing transmission of information utilizes cryptography, where a message or string of characters is transformed into a form understood only by the intended recipient.

A typical conventional approach to encrypting data utilizes a cryptographic algorithm and a set of cryptographic keys. The decrypting algorithm is typically the same as the encrypting program performed in reverse order. Public-key encryption makes one key public and another key private. Both the sender and the recipient should have the keys to encrypt and decrypt the information. Security of the encrypted data using cryptographic keys depends on keeping the keys secret and protecting the keys from being determined by third-party cryptanalysis. Methods for preventing cryptanalysis comprise iterated cryptosystems and the "one time pad" cryptosystem. An example of an iterated cryptosystem is the Data Encryption Standard (DES) developed by IBM. An example of a secure public-key cryptosystem is the Rivest, Shamir, Adleman (RSA) system.

The "one time pad" system utilizes a randomly selected key. This key is used only once and is equal or greater in length than the data to be encrypted. Because the key is random and used only once, the probability of decrypting the encrypted data without the knowledge of the key is very low. However, the recipient of the encrypted data requires the key to decrypt the data and the recipient requires a new key for each message. Consequently, a "one time pad" system is more appropriate for transmitting top-secret messages such as government messages than for large quantities of data.

Fortunately, effective data security does not require an unbreakable code. Rather, encrypted information should be encrypted at a level such that the work involved to decipher the encryption is greater than the reward for success.

Pseudo-random sequences are used to encrypt information provided the sequence is sufficiently random and secure. An adversary should not be able to predict a sequence based on past values or be able to deduce initial values. The goal of pseudo-random sequences is for the sequence to appear noise-like and non-repeating (aperiodic).

Algorithms utilizing equations from chaos theory have been used to create these pseudo-random sequences. The purpose of using equations from chaos theory is to encrypt information in such a way that is aperiodic to prevent an adversary from decrypting information contained in the sequence. However, the equations and algorithms used to create these pseudo-random sequences are complex.

Implementations of conventional approaches to encryption either involve storing a key that is liable to discovery by an adversary or attacker, or utilizing complex chaos theory equations.

What is therefore needed is a system, a computer program product, and an associated method for an encryption process that can be customized by the user, making the encryption process unique to the user, thus providing security from adversaries. This process should be easy to implement and require minimal processing by the computer. The keys for decrypting the encrypted information should not be stored in a database or transmitted in such a manner that adversaries may be able to decrypt the information. The need for such a system and method has heretofore remained unsatisfied.

SUMMARY OF THE INVENTION

The present invention satisfies this need, and presents a system, a computer program product, and an associated method (collectively referred to herein as "the system" or "the present system") for encrypting character data (strings) of any given length using derivative equations and factors. The use of factors and derivative equations introduces the randomness required for effective encryption without the use of complex mathematics such as chaos theory.

The present system uses for encryption a set of equations determined by the user in a manner similar to a key. Unlike conventional encryption technology using keys, the results can be random. In addition, only a portion of the key is exposed to decrypt the encrypted information. Unlike convention encryption technology using complex equations to produce randomized results, the present system uses a simple approach that may be customized by the user in an infinite variety of ways. The user may configure the present system using either simple or complex equations.

The present system is a simple process involving a minimum of steps to implement. Unlike an application utilizing chaos theory equations, extensive mathematical skills are not required to implement the present system. The present system may be implemented in an unlimited number of variations; no two implementations may be the same.

The present system is portable, and can be implemented in any programming language that supports cyclical character manipulation; i.e., C, C++, Java, etc. The present system also supports input from a variety of sources, allowing control from the administrator side, string value side, or any other input that may be extracted from the desired programming language.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Original String: Refers to a set of characters that represent information requiring encryption.

Encrypted String: Refers to a set of characters that represent information that has been encrypted such that the original string cannot easily be determined.

Figure 1:
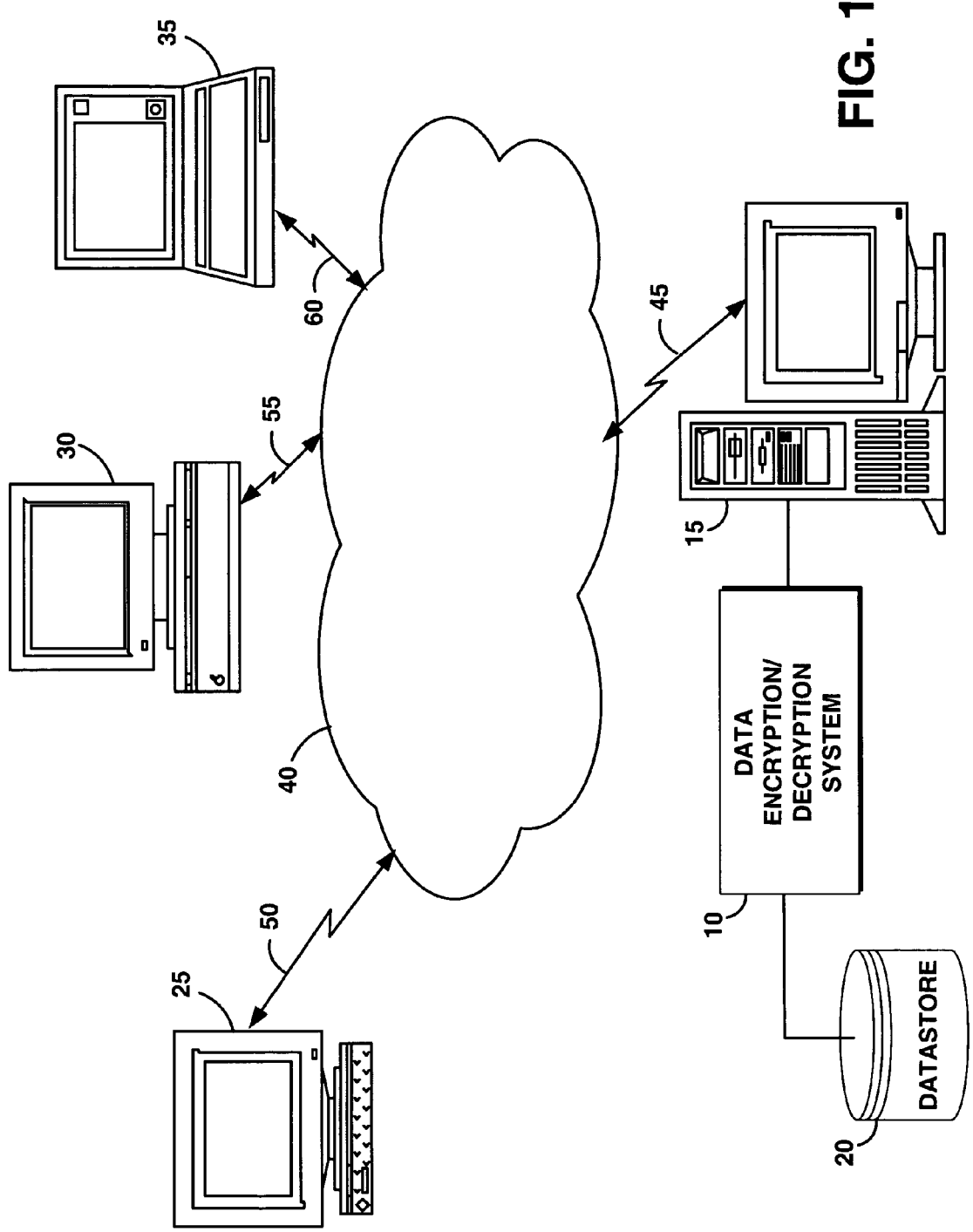
FIG. 1 is a schematic illustration of an exemplary operating environment in which a cryptographic system of the present invention can be used.

FIG. 1 portrays an exemplary overall environment in which a system and associated method for encrypting and decrypting data using derivative equations and factors according to the present invention may be used. System 10 comprises a software programming code or a computer program product that is typically embedded within, or installed on a host server 15. Alternatively, system 10 can be saved on a suitable storage medium such as a diskette, a CD, a hard drive, or like devices.

Information in host server 15 that should be kept secure is encrypted by system 10 and stored in a database 20. Examples of such information might be passwords, credit card numbers, etc.

Users, such as remote Internet users, are represented by a variety of computers such as computers 25, 30, 35, and can access the host server 15 through a network 40. Computers 25, 30, 35 each comprise software that allows the user to interface securely with the host server 15. The host server 15 is connected to network 40 via a communications link 45 such as a telephone, cable, or satellite link. Computers 25, 30, 35 can be connected to network 40 via communications links 50, 55, 60, respectively. While system 10 is described in terms of network 40, computers 25, 30, 35 may also access system 10 locally rather than remotely. Computers 25, 30, 35 may access system 10 either manually, or automatically through the use of an application.

The present system maps each character in an original string, $S_O$, to an encrypted character in an encrypted string, $E_O$, using a set of equations. The original string, $S_O$, is comprised of N characters, C:

$$S_O = C_0, C_1, C_2, C_3, \ldots, C_N$$

An implementer may use as many encryption equations as desired to obtain the level of randomness and complexity required in the encryption process. The implementer chooses a set of factors to be used in the equations.

The factors comprise the following types: factors provided by the administrator, random values, or objects or values related to the original string, etc. These factors may be, for example, a number selected by the administrator, the current hour of the day, minute of the hour, or second of the minute, some other random number easily available from the operating system of host server 15, or the length of the original string to be encrypted. In addition, the factors may be random numbers created by a function such as a random generator or an equation such as the chaos equation.

In an exemplary embodiment, to create the encryption module, the implementer creates an encryption equation that is a function of the original string, $S_O$, and the factors:

$$E_O = f(S_O, F_1, F_2, \ldots, F_N)$$

where $F_1, F_2, \ldots, F_N$ are the factors. The implementer then creates a set of derivative equations that are functions of the factors:

$$D_1 = f(F_1, F_2, \ldots, F_N)$$
$$D_2 = f(F_1, F_2, \ldots, F_N)$$
$$\vdots$$
$$D_N = f(F_1, F_2, \ldots, F_N).$$

To create the decryption module, the implementer uses the derivative values and factor decryption equations to solve for the factors $F_1, F_2, \ldots, F_N$:

$$F_1 = f(D_1, D_2, \ldots, D_N)$$
$$F_2 = f(D_1, D_2, \ldots, D_N)$$
$$\vdots$$
$$F_N = f(D_1, D_2, \ldots, D_N)$$

The implementer then uses the encryption equation and the factors to solve for the original string:

$$S_D = f(E_O, F_1, F_2, \ldots, F_N)$$

The values stored in database 20 are the encrypted string $E_O$ and the derivatives. The encryption equation and derivative equations are written as programming code within the encryption module. The decryption equation and factor decryption equations are written as programming code within the decryption module.

The encrypted string is created by encrypting each character of the original string individually and concatenating the encrypted characters to the encrypted string in order. Provided to the decryption module are the encrypted string and the derivatives. Unless an adversary or attacker is able to access the encryption code, the adversary is unable to determine the relation between the characters in the string and the derivatives. In another feature of system 10, additional derivatives may be provided that are not actually used to determine the factors; the presence of these false derivatives provide an additional level of security in the encryption method of system 10.

Figure 2:
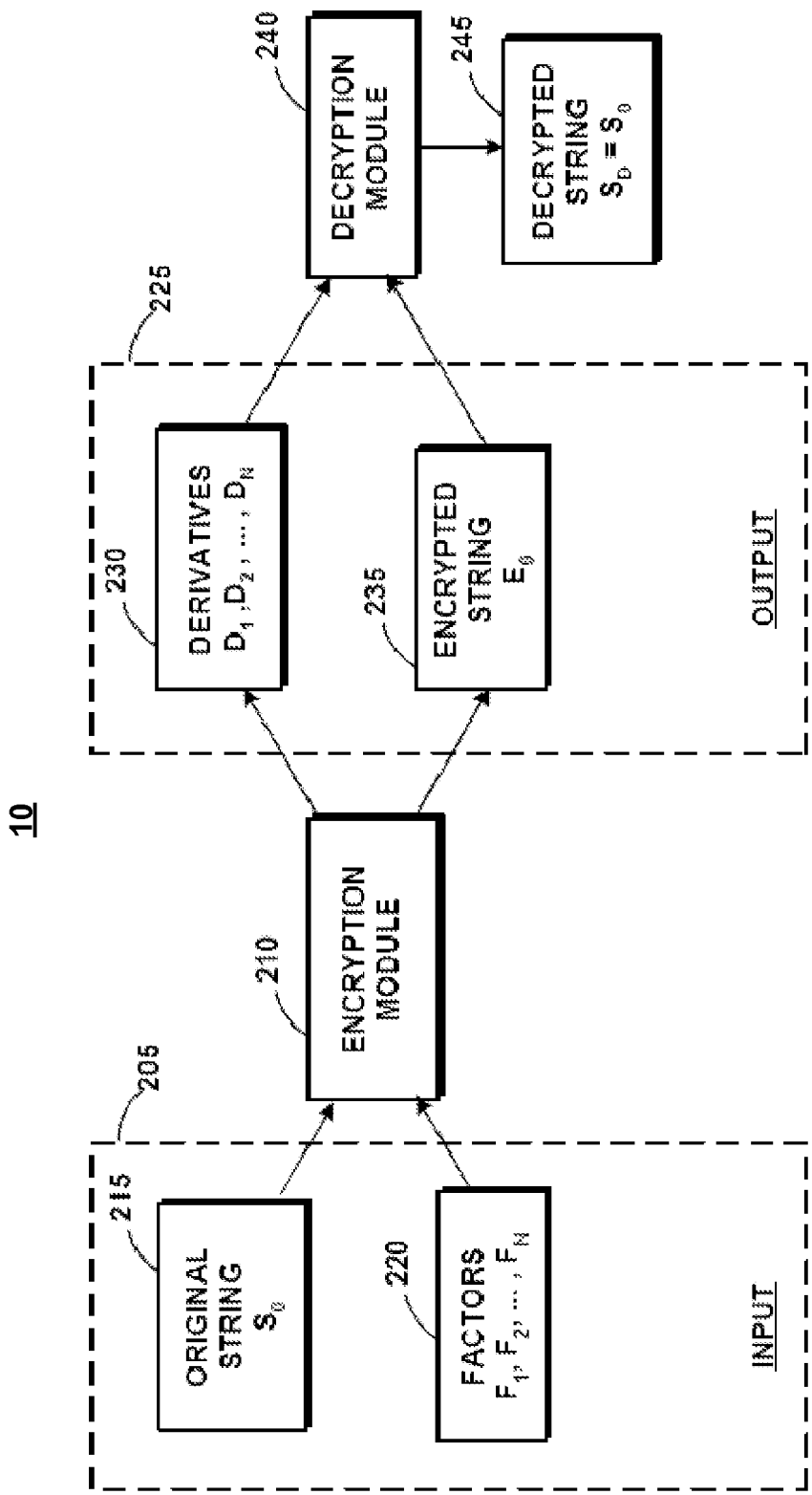
FIG. 2 is a block diagram of the high-level architecture of the cryptographic system of FIG. 1.

The high-level architecture of system 10 is illustrated by the diagram of FIG. 2. An input 205 to an encryption module 210 comprises an original string 215 ($S_O$) and factors 220 ($F_1, F_2, \ldots, F_N$). An output 225 from the encryption module 210 comprises derivatives 230 ($D_1, D_2, \ldots, D_N$) and an encrypted string 235 ($E_O$). A decryption module 240 decrypts output 225 to produce a decrypted string 245 ($S_D$). The decrypted string 245 is equal to the original string 215.

Figure 3:
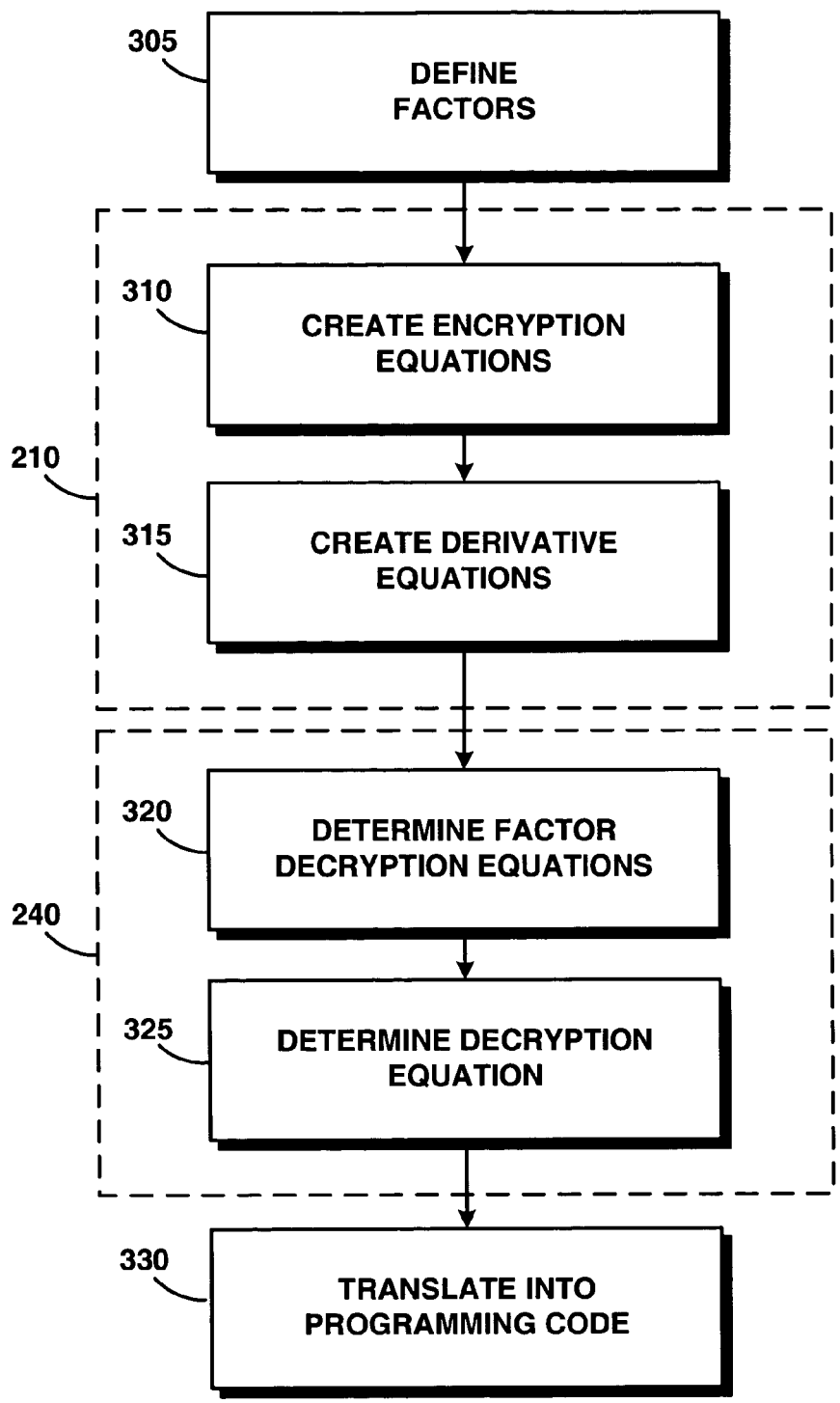
FIG. 3 is a process flow chart illustrating a method of defining the factors, derivatives, and equations used by the cryptographic system of FIGS. 1 and 2.

A method 300 illustrating the process of developing the encryption module 210 and the decryption module 240 is illustrated by the process flow chart of FIG. 3. At block 305, an implementer such as a system administrator selects or defines factors 220. For example, the implementer may choose a number, 7, the minute of the hour, and the length of the string:

$F_1 = 7$ $F_2 =$ minute of the hour $F_3 =$ length of the string.

Administrative keys form a subcategory of factors. The only requirement is that factors exist. Therefore, a set of factors using all random factors (i.e., another subcategory) is acceptable so long as the derivatives can be uniquely related to the factors.

The implementer then creates an encryption equation at block 310 that describes the encryption equation as a function of a character in the original string 215 and factors 220 (i.e., $F_1$, $F_2$, $F_3$). For example, the implementer may create the following equation that maps a character in the original string 215, $S_0(C)$, to a character in the encrypted string 235, $E_0(C)$:

$$E_0(C)=S_0(C)+F_1+F_2*F_3/2. \qquad (1)$$

The encryption equation may be as complex as the implementer requires, as long as the implementer can create derivative equations that can be solved by the decryption module 240 to determine factors 220.

The implementer creates a set of derivative equations at block 315. The number of derivative equations required is greater or equal to the number of factors 220 selected by the implementer. For example, the implementer may define derivatives 230 as follows:

$$D1=F1+F2-F3 \qquad (2)$$

$$D2=F1-2F2+3F3 \qquad (3)$$

$$D3=F3-F1+2 \qquad (4)$$

The encryption module 210 is comprised of the encryption equation, factors 220, and the derivative equations. The derivative equations may be as complex as desired provided that an equation for factors 220 may be written in terms of derivatives 230. Additional derivative equations may be created to act as decoys within the encryption and decryption process. Because derivatives 230 are defined in terms of factors 220, factors 220 may change from encryption to encryption, allowing the use of random values based on time values such as the value the minute of the hour when the encryption is performed, for example.

The decryption module 240 comprises a set of factor decryption equations and a decryption equation. The decryption equation uses factors 220 derived from the factor decryption equations and the encrypted string 235 to obtain the decrypted string 245, $S_D$, that is equivalent to the original string 215, $S_0$. The implementer solves the decryption equations for factors 220 at block 320, obtaining the factor decryption equations that map derivatives 230 to factors 220. For example, by using standard algebraic manipulation the implementer may solve the exemplary factors 220 in terms of derivatives 230 (i.e., $D_1$, $D_2$, and $D_3$):

$$F_1=0.5D_1+0.25D_2-0.25D_3+0.5 \qquad (5)$$

$$F_2=D_1+D_3-2 \qquad (6)$$

$$F_3=0.5D_1+0.25D_2+0.75\,D_3-1.5 \qquad (7)$$

The implementer then solves the encryption equation $E_0$ to obtain the decryption equation (block 325). For example, equation (1) solved for the original string 215, $S_0$, yields:

$$S_D(C)=S_0(C)=E_0(C)-F_1-F_2*F_3/2 \qquad (8)$$

At block 330, the implementer converts the encryption equation and derivative equations into programming code for the encryption module 210; the factor decryption equations and the decryption equations are converted into programming code for the decryption module 240. For example, equations (1), (2), (3) and (4) are converted into programming code for the encryption module 210 and equations (5), (6), (7), and (8) are converted into programming code for the decryption module 240.

Figure 4:
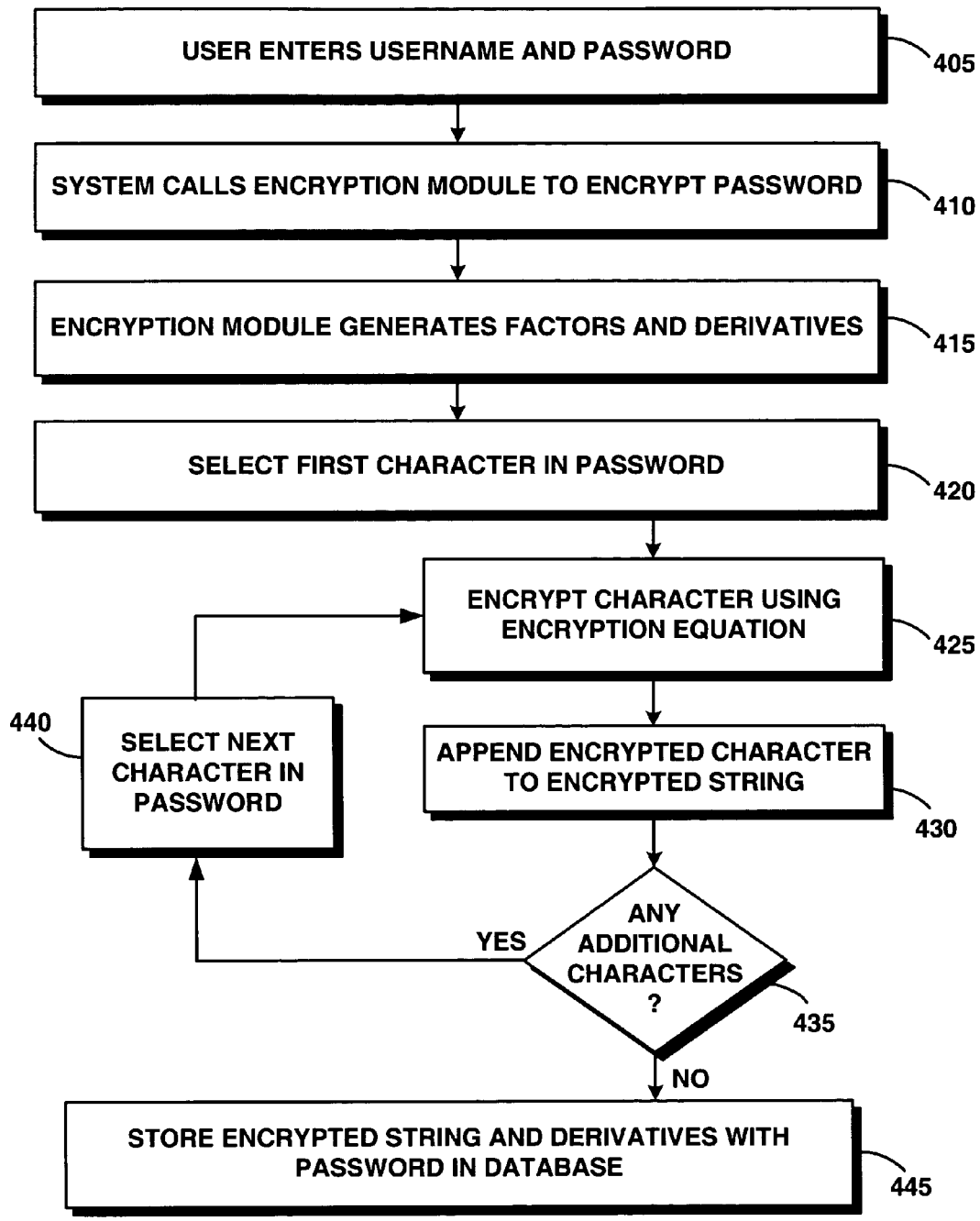
FIG. 4 is a process flow chart illustrating a method of operation of the cryptographic system of FIGS. 1 and 2 when used to encrypt a password.

A method 400 of the encryption module 210 of system 10 is illustrated by a process flow chart of FIG. 4, using an example of a user registering for a service such as a paid subscription to a database. The user registers for access to the database at block 405 by entering a user name and a password. System 10 calls the encryption module 210 to encrypt the password at block 410. The encryption module 210 generates factors 220 as required by the encryption module 210 and calculates derivatives 230 (block 415). Some of factors 220 used by the encryption module 210 may be constant values provided by the administrator when the encryption module 210 is created. Other factors 220 may be random values generated by the encryption module 210 at the time the password is encrypted.

The encryption module 210 selects a character such as, for example, the first character in the password at block 420 and encrypts that character using the encryption equation at block 425. The encrypted character is appended to the encrypted string 235 at block 430. System 10 determines at decision block 435 whether additional characters remain to be encrypted in the password. If additional characters remain to be encrypted, system 10 proceeds to block 440 and selects the next character in the password. Blocks 425 through 440 of method 400 are repeated until no more characters remain for encryption (decision block 435).

System 10 then stores the encrypted string 235 and derivatives 230 generated at block 415 with the user name in a database record of database. While the encrypted password is stored with derivatives 230 in database 20, no information is stored that can be used to determine how to decrypt the password. The equations used to decrypt the password are programming code in the encryption module 210. To decrypt the password, an adversary would have to identify the appropriate equations in the encryption module 210 and then use derivatives 230 appropriately to decrypt the password; this is a very difficult task.

Figure 5A:
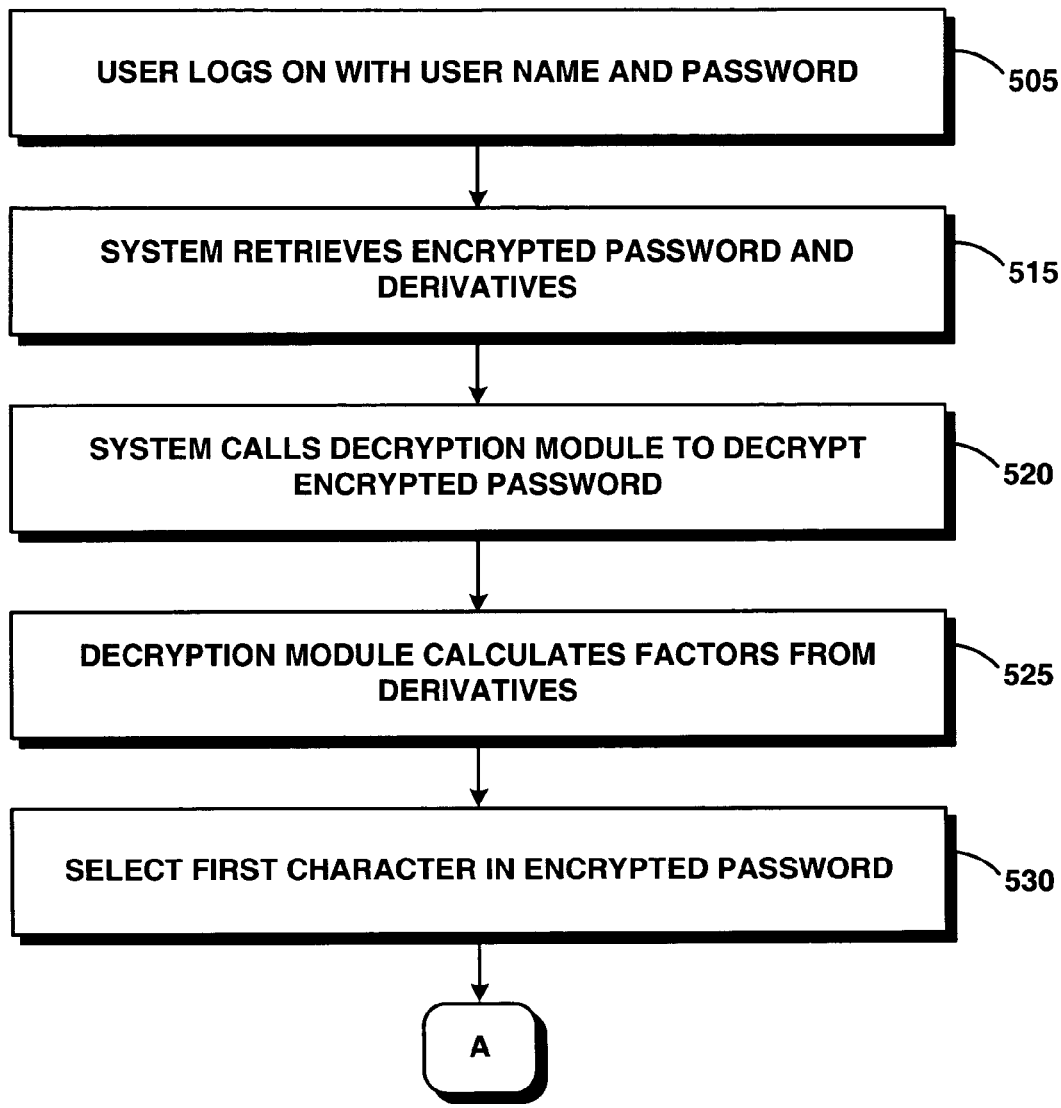
FIG. 5 is comprised of FIGS. 5A and 5B and represents a process flow chart illustrating a method of operation of the cryptographic system of FIGS. 1 and 2 when used to decrypt an encrypted password to authenticate a password entered by a user.
Figure 5B:
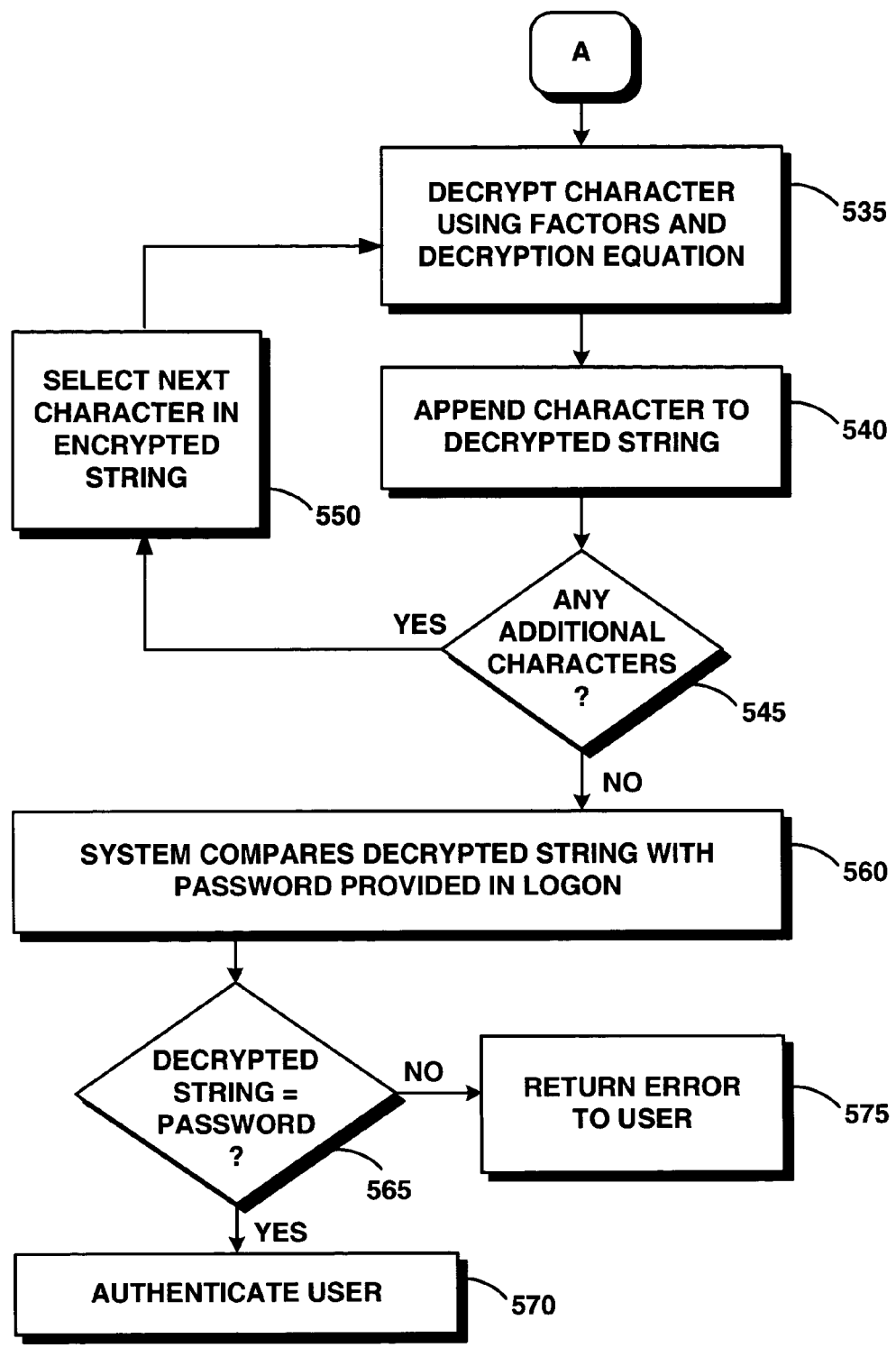

A method 500 for decrypting the encrypted string 235 is illustrated by the process flow chart of FIG. 5 (FIGS. 5A and 5B), using the example of authenticating a user login to a subscription database with the stored encrypted password created by method 400. A user logs onto the subscription database at block 505 with their user name and password. For the username provided by the user (block 510), system 10 retrieves the encrypted password and derivatives 230 from the database 20.

System 10 then calls the decryption module 240 to decrypt the encrypted password at block 520. At block 525, the decryption module 240 calculates factors 220 from derivatives 230 using the factor decryption equations in the decryption module 240.

System 10 selects a character such as, for example, the first character in the encrypted password for decryption (block 530). The decryption module 240 decrypts the encrypted character at block 535 (FIG. 5B) using factors 220 and the decryption equation.

At block 540, system 10 appends the decrypted character to the decrypted string 245. System 10 determines at decision block 545 whether any additional characters remain to be decrypted. If yes, system 10 proceeds to block 550 and selects the next character in the encrypted string 235. System 10 repeats blocks 535 through 550 until no characters in the encrypted string 235 remain to be decrypted.

After all the characters in the encrypted string 235 have been decrypted, system 10 compares the decrypted string 245 with the password provided by the user at log-on (block 560). If system 10 determines at decision block 565 that the decrypted string 245 is identical to the password provided by the user, system 10 authenticates the user at block 570, allowing the user access to the subscription database. If the decrypted string 245 is not identical to the password provided by the user, system 10 returns an error to the user and denies the user access to the subscription database.

It is to be understood that the specific embodiments of the invention that have been described are merely illustrative of certain applications of the principle of the present invention. Numerous modifications may be made to system and method for encrypting and decrypting data using derivative equations and factors invention described herein without departing from the spirit and scope of the present invention.

In addition, while the present invention has been described in view of a single dimension of sets of factors and derivative equations, it should be understood that the sets of factors and derivative equations could be subsets of higher level sets of factors and derivative equations, respectively, with indicators that identify the higher level sets of factors and derivative equations that have been selected.

Moreover, while the present invention is described for illustration purpose only in relation to the WWW, it should be clear that the invention is applicable as well to, for example, to any application where data is encrypted.

What is claimed is:

1. A computer-implemented method for encrypting and decrypting an original string that is storable in a database, the method comprising:

defining a set of factors to be used for encrypting the original string;

using an encryption equation to map the original string to an encrypted string, the encryption equation being a function of the original string and the set of factors;

using a set of derivative equations to generate derivative values from the set of factors;

storing the encrypted string and the generated derivative values in the database;

providing one or more false derivatives that cannot be used to determine a given factor from the set of factors;

additionally storing the one or more false derivative values in the database with the generated derivative values;

using a set of factor decryption equations to map each of the generated derivative values stored in the database to a corresponding factor in the set of factors; and decrypting the encrypted string stored in the database using a decryption equation and each factor mapped through the set of factor decryption equations to generate a decrypted string that is equal to the original string, wherein a presence of the one or more false derivative values with the generated derivative values in the database prevents an attacker from knowing which of the one or more false derivative values and the generated derivative values to use with the factor decryption equation to derive the factors in the set of factors.

2. The method of claim 1, wherein the set of factors comprises at least one of: constant values, numbers, objects, and random values that are derived from events.

3. The method of claim 1, wherein the set of factors comprises at least one of: constant values, numbers, objects, and random values that are derived from values provided by equations.

4. The method of claim 1, wherein the set of derivative equations comprise mathematical functions that are defined in terms of the set of factors.

5. The method of claim 1, wherein a number of derivative equations in the set of derivative equations is at least equal to a number of factors in the set of factors.

6. The method of claim 1, wherein the original string is comprised of characters.

7. The method of claim 1, wherein the decryption equation is a mathematical function of the encrypted string and each of the factors mapped through the set of factor decryption equations.

8. The method of claim 1, wherein defining the set of factors comprises defining at least one factor.

9. The method of claim 1, wherein the set of derivative equations comprises at least one derivative equation.

* * * * *